US007841458B2

(12) United States Patent
Schneidewind

(10) Patent No.: US 7,841,458 B2
(45) Date of Patent: Nov. 30, 2010

(54) AUTOMATIC TRANSMISSION CLUTCH HAVING A ONE-PIECE RESIN BALANCER

(75) Inventor: Brian C. Schneidewind, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 566 days.

(21) Appl. No.: 11/775,366

(22) Filed: Jul. 10, 2007

(65) Prior Publication Data
US 2009/0014274 A1    Jan. 15, 2009

(51) Int. Cl.
*F16D 25/0638* (2006.01)
(52) U.S. Cl. .............................. 192/85.25; 192/106 F; 192/85.54
(58) Field of Classification Search ................ 192/85.25
See application file for complete search history.

(56) References Cited

U.S. PATENT DOCUMENTS

| 4,635,778 | A |   | 1/1987  | Lederman |         |
|-----------|---|---|---------|----------|---------|
| 4,730,713 | A |   | 3/1988  | Pickard et al. | |
| 5,022,313 | A |   | 6/1991  | Shontz et al. | |
| 5,172,799 | A | * | 12/1992 | Iijima et al. | 192/106 F |
| 5,224,413 | A |   | 7/1993  | Herner   |         |
| 5,353,689 | A |   | 10/1994 | Bolt et al. | |
| 5,492,053 | A |   | 2/1996  | Stonehill | |
| 5,630,492 | A | * | 5/1997  | Yoshikawa et al. | 192/106 F |
| 5,662,198 | A |   | 9/1997  | Kojima et al. | |
| 7,059,461 | B2 |  | 6/2006  | Raszkowski | |
| 7,284,647 | B2 | * | 10/2007 | Onishi et al. | 192/85 AA |
| 2005/0217962 | A1 | * | 10/2005 | Pedersen et al. | 192/85 AA |

* cited by examiner

*Primary Examiner*—David D Le
*Assistant Examiner*—Ryan Dodd
(74) *Attorney, Agent, or Firm*—Gifford, Krass, Sprinkle, Anderson & Citkowski, P.C.

(57) ABSTRACT

A clutch assembly for use in an automatic transmission of a motor vehicle includes a drum movable about a rotational axis and having a generally annular recess for supporting components of the clutch assembly therein. A clutch pack is supported in the recess in the drum. A clutch piston is movably coupled to the drum and movable in a generally axial direction between engaged and disengaged positions relative to the clutch pack. At least one biasing spring continuously biases the clutch piston toward the disengaged position. A resin balancer plate has a side wall in contact with one end of the at least one biasing spring. The side wall is reinforced by a box section formed by: an outer wall that extends at an angle from one end of the side wall, an inner wall that extends from an opposite end of the side wall and is stepped in an axial direction toward the clutch piston, and a reinforcing rib interconnecting the side wall, outer wall and inner wall. An integral lip extends from an outer end of the balance plate to form a seal with the clutch piston.

19 Claims, 2 Drawing Sheets

AUTOMATIC TRANSMISSION CLUTCH HAVING A ONE-PIECE RESIN BALANCER

FIELD OF THE INVENTION

The invention relates to a clutch assembly for an automatic transmission of a motor vehicle. More particularly, the invention relates to a one-piece resin balancer and a clutch assembly having the same.

BACKGROUND OF THE INVENTION

It remains desirable to provide an improved automatic transmission design that is lighter in weight and less expensive to manufacture than conventional automatic transmissions.

SUMMARY OF THE INVENTION

According to one aspect of the invention, a clutch assembly is provided for use in an automatic transmission of a motor vehicle. The clutch assembly includes a drum movable about a rotational axis and having a generally annular recess for supporting components of the clutch assembly therein. A clutch pack is supported in the recess in the drum. A clutch piston is movably coupled to the drum and movable in a generally axial direction between engaged and disengaged positions relative to the clutch pack. At least one biasing spring continuously biases the clutch piston toward the disengaged position. A resin balancer plate has a side wall in contact with one end of the at least one biasing spring. The side wall is reinforced by a box section formed by: an outer wall that extends at an angle from one end of the side wall, an inner wall that extends from an opposite end of the side wall and is stepped in an axial direction toward the clutch piston, and a reinforcing rib interconnecting the side wall, outer wall and inner wall.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
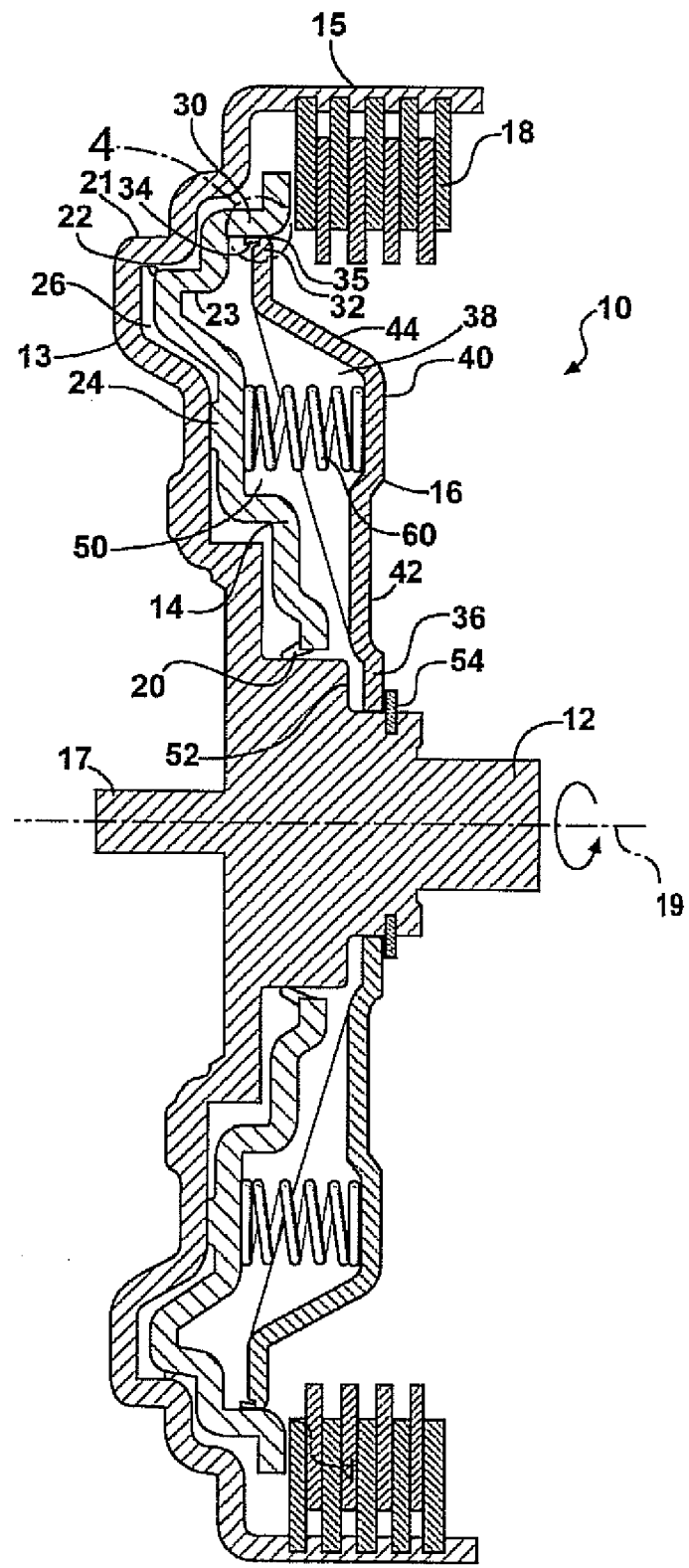
FIG. 1 is a cross sectional view of a clutch assembly according to one embodiment of the invention.

Referring to FIG. 1, a clutch assembly according to one embodiment is generally indicated at 10. The clutch assembly 10 includes a drum 12. The drum 12 includes a central hub 17 that is generally cylindrical and extends along a rotational axis 19. The drum 12 also includes a peripheral end wall 15 that is radially spaced apart from the hub 17. A side wall 13 extends generally radially between the end wall 15 and hub 17. The side wall 13, end wall 15 and hub 17 form an annular recess for supporting the components of the clutch assembly 10, which include a clutch piston 14, a balancer plate 16 and a clutch pack 18. These components 13, 15, 17 rotate with the drum 12 about the rotational axis 19.

The clutch piston 14 extends along the side wall 13 and has a shape corresponding with that of the side wall 13. Both the clutch piston 14 and the side wall 13 have corresponding axially extending portions 21, 23. An outer seal 22 extends from the axially extending portion 23 of the clutch piston 14 to contact and form a seal with the axially extending portion 21 of the side wall 13. An inner seal 20 extends from an inner end of the clutch piston 14 to contact and form a seal with the hub 17. The clutch piston 14 is axially spaced apart from the side wall 13 to define a fluid chamber 26 therebetween. The chamber 26 extends between the inner 20 and outer 22 seals. Increasing or decreasing the fluid pressure in the chamber 26 causes axial displacement of the clutch piston 14 between engaged and disengaged positions with respect to the clutch pack 18. A boss 24 extends from a generally radially extending surface of the clutch piston 14 toward the side wall 13 to maintain a minimum axial distance between clutch piston and the drum 12. In one embodiment, the boss 24 may be an annular ring that extends axially toward the side wall 13 of the drum 12.

Figure 4:
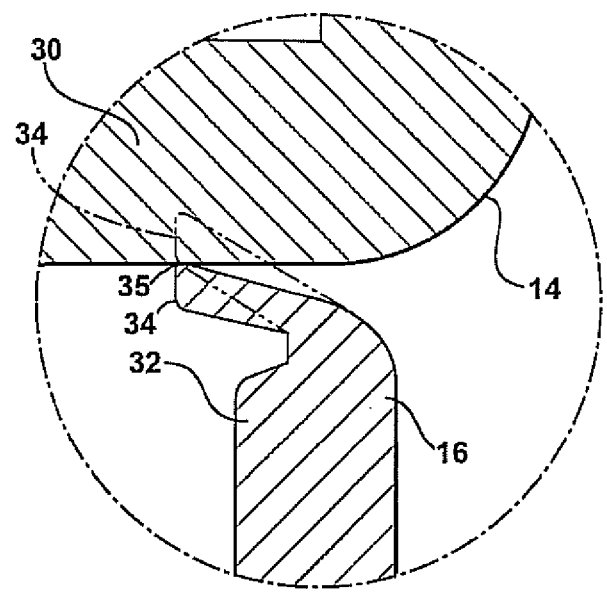
FIG. 4 is an enlarged cross sectional view of the clutch assembly as indicated at 4 in FIG. 1.

The clutch piston 14 includes an axially extending end portion 30 that defines a generally annular ring or cup shaped recess for supporting the balancer plate 16 therein. The balance plate 16 is formed from a resin material, such as polyphenylene sulfide or PPS. Other resins having similar properties may be used to form the balancer plate 16. Reinforced resins may also be used to form the balancer plate 16. Any suitable process known by those having ordinary skill in the art may be used to form the balancer plate 16, such as injection molding or compression molding. The balancer plate 16 includes an outer end 32 in contact with the end portion 30 of the clutch piston 14. More specifically, an integral flexible lip 34 is formed at the outer end of the balancer plate 16. As best shown in FIG. 4, the lip 34 contacts the end portion 30 in an interference fit, which is illustrated by the difference in position between the lip 34 shown in dotted lines and the lip 34 shown in solid lines. The lip 34 in dotted lines indicates an uncompressed or uninstalled state, while the lip 34 in solid lines indicates a compressed or installed state in contact with the end portion 30 of the clutch piston 14. The contact between the compressed lip 34 and the end portion 30 forms a seal 35 that prevents fluid from leaking therebetween. The inner end 36 of the balancer plate 16 is axially retained between a radially extending locating surface 52 and a retainer ring 54 that is secured to the hub 17. The balance plate 16 is axially spaced apart from the clutch piston 14 to define a second fluid chamber 50 therebetween that extends generally radially between the seal 35 and the inner end 36 of the balance plate 16.

The balancer plate 16 also includes a generally radially extending side wall 40. An outer wall 44 extends at an angle between the outer end 32 of the balancer plate 16 and the side wall 40. An inner wall 42 extends between the side wall 40 and the inner end 36 of the balancer plate 16. The inner wall 42 is spaced radially inwardly from the side wall 40. The inner wall 42 is also generally parallel with the side wall 40 and is stepped axially toward the clutch piston 14 relative to the side wall 40.

At least one piston return spring 60 is compressed between the clutch piston 14 and the balancer plate 16. The return spring 60 biases the clutch piston 14 in the axial direction toward the side wall 13 of the drum 12. One end of the spring 60 contacts the side wall 40 and is radially constrained on the side wall 40 between the angled outer wall 44 and the axially stepped inner wall 42.

Figure 2:
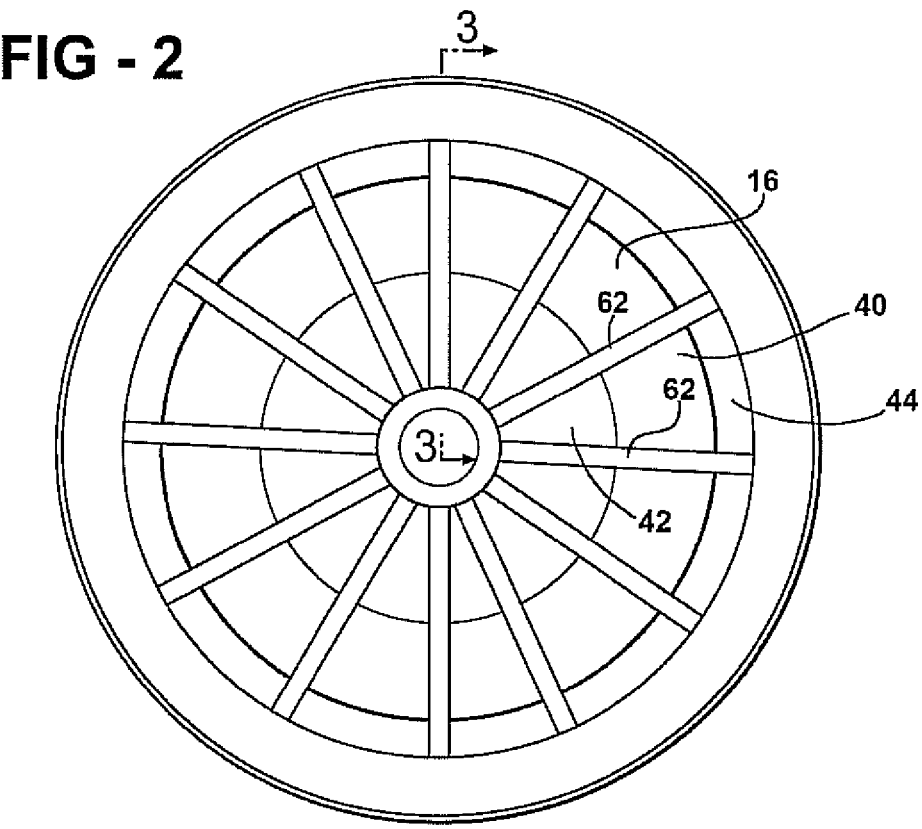
FIG. 2 is a front elevational view of a balancer in the clutch assembly.
Figure 3:
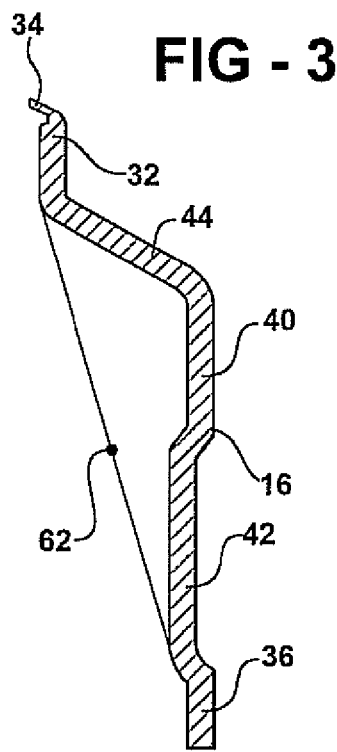
FIG. 3 is a cross sectional view of the balancer as indicated at 3-3 in FIG. 2.

A high axial load is applied by the return spring 60 on both the clutch piston 14 and the balancer plate 16. Referring to FIGS. 1-3, a plurality of reinforcing ribs 62 are formed integrally on the balancer plate 16 to handle the load applied by the return spring 60. The ribs 62 extend radially outwardly between the outer 32 and inner 36 ends of the balancer plate 16. Each rib 62 interconnects the outer wall 44, the side wall 40 and the inner wall 42 of the balancer plate 16. As best shown in the front elevational view of FIG. 2, each adjacent pair of ribs 62 forms an open-ended box section with the outer wall 44, side wall 40 and inner wall 42.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A clutch assembly for use in an automatic transmission of a motor vehicle, said clutch assembly comprising:
    a drum movable about a rotational axis, the drum having a generally annular recess for supporting components of the clutch assembly therein;
    a clutch piston movably coupled to the drum and movable in a generally axial direction between engaged and disengaged positions;
    a single piece balancer plate extending between the drum and the clutch piston, said balancer plate composed solely of a resin material; and
    a flexible lip formed as one piece with the balancer plate, the lip being compressed in an interference fit with the clutch piston to form a seal therewith.

2. The clutch assembly as set forth in claim 1, wherein the flexible lip extends from an outer end of the balancer plate.

3. The clutch assembly as set forth in claim 2, wherein the lip extends generally axially toward the clutch piston when forming the seal.

4. The clutch assembly as set forth in claim 2, wherein the clutch piston includes an axially extending end portion that defines a recess for supporting the balancer plate therein.

5. The clutch assembly as set forth in claim 4, wherein the lip is compressed in the interference fit with the axially extending end portion to form the seal therewith.

6. The clutch assembly as set forth in claim 5, wherein an inner end of the balancer plate extends to a central hub of the drum.

7. The clutch assembly as set forth in claim 6, wherein the balancer plate and clutch piston are spaced apart to define a chamber therebetween, the chamber extending between the seal and the inner end of the balancer plate.

8. The clutch assembly as set forth in claim 7 including a retainer ring fixedly secured in at least an axial direction relative to the central hub and constraining the balancer plate relative to the drum in the axial direction.

9. The clutch assembly as set forth in claim 1, wherein at least one biasing spring continuously biases the clutch piston toward the disengaged position, and wherein the balancer plate includes a plurality of reinforcement ribs and a side wall portion, wherein the plurality of reinforcing ribs extend radially from the rotational axis and the side wall portion is in contact with one end of the at least one biasing spring, and wherein each pair of adjacent reinforcing ribs and the side wall portion form an open ended box-shaped portion to provide structural reinforcement to the balancer plate.

10. The clutch assembly as set forth in claim 1, wherein the drum and the clutch piston have generally parallel and spaced apart axially extending portions.

11. The clutch assembly as set forth in claim 10, wherein an outer seal extends from the axially extending portion of the clutch plate and contacts the axially extending portion of the drum.

12. The clutch assembly as set forth in claim 9, wherein the balancer plate includes an outer wall portion extending at an angle from one end of the side wall portion, an inner wall portion extending from an opposite end of the side wall portion and being stepped in an axial direction toward the clutch piston, and wherein each adjacent pair of ribs interconnects the side wall portion, the outer wall portion and the inner wall portion to form the box-shaped portion.

13. The clutch assembly as set forth in claim 1, wherein the balancer plate is formed from polyphenylene sulfide resin.

14. The clutch assembly as set forth in claim 13, wherein the balancer plate is injection molded.

15. A clutch assembly for use in an automatic transmission of a motor vehicle, said clutch assembly comprising:
    a drum movable about a rotational axis, the drum having a generally annular recess for supporting components of the clutch assembly therein;
    a clutch piston movably coupled to the drum and movable in a generally axial direction between engaged and disengaged positions;
    at least one biasing spring continuously biasing the clutch piston toward the disengaged position; and
    a balancer plate extending between the drum and the clutch piston and composed solely of a resin material, the balancer plate having a plurality of reinforcing ribs and a side wall portion, wherein the plurality of reinforcing ribs extend radially relative to the rotational axis and the side wall portion is in contact with one end of the at least one biasing spring, and wherein each pair of adjacent reinforcing ribs and the side wall portion form an open ended box-shaped portion to provide structural reinforcement to the balancer plate.

16. The clutch assembly as set forth in claim 15, wherein the balancer plate includes an outer wall portion extending at an angle from one end of the side wall portion, an inner wall portion extending from an opposite end of the side wall portion and being stepped in an axial direction toward the clutch piston.

17. The clutch assembly as set forth in claim 16, wherein each adjacent pair of ribs interconnects the side wall portion, the outer wall portion and the inner wall portion to form the box-shaped portion.

18. The clutch assembly as set forth in claim 15, wherein the balancer plate is formed from polyphenylene sulfide resin.

19. The clutch assembly as set forth in claim 15, wherein the balancer plate is injection molded.

* * * * *